United States Patent
Diggs et al.

(10) Patent No.: US 8,078,918 B2
(45) Date of Patent: Dec. 13, 2011

(54) SOLID STATE STORAGE SUBSYSTEM THAT MAINTAINS AND PROVIDES ACCESS TO DATA REFLECTIVE OF A FAILURE RISK

(75) Inventors: Mark S. Diggs, Laguna Hills, CA (US); David E. Merry, Jr., Irvine, CA (US)

(73) Assignee: SiliconSystems, Inc., Aliso Viejo, CA (US)

( * ) Notice: Subject to any disclaimer, the term of this patent is extended or adjusted under 35 U.S.C. 154(b) by 325 days.

(21) Appl. No.: 12/027,965

(22) Filed: Feb. 7, 2008

(65) Prior Publication Data
US 2009/0204852 A1     Aug. 13, 2009

(51) Int. Cl.
G06F 11/00     (2006.01)
(52) U.S. Cl. .......................................... 714/42; 714/47.2
(58) Field of Classification Search .................. None
See application file for complete search history.

(56) References Cited

U.S. PATENT DOCUMENTS

| | | | |
|---|---|---|---|
| 4,296,464 A * | 10/1981 | Woods et al. ................. | 710/308 |
| 5,442,768 A | 8/1995 | Sudoh et al. | |
| 5,768,612 A | 6/1998 | Nelson | |
| 5,890,219 A | 3/1999 | Scaringella et al. | |
| 6,000,006 A | 12/1999 | Bruce et al. | |
| 6,269,434 B1 | 7/2001 | Tanaka | |
| 6,401,214 B1 * | 6/2002 | Li ..................................... | 714/6 |
| 6,434,648 B1 | 8/2002 | Assour et al. | |
| 6,530,034 B1 * | 3/2003 | Okada et al. .................. | 714/5.11 |
| 6,564,173 B1 * | 5/2003 | Arntz et al. .................... | 702/183 |
| 6,675,281 B1 | 1/2004 | Oh et al. | |
| 6,704,012 B1 | 3/2004 | Lefave | |
| 6,732,221 B2 | 5/2004 | Ban | |
| 6,754,765 B1 | 6/2004 | Chang et al. | |
| 6,761,580 B2 | 7/2004 | Chang | |
| 6,892,248 B2 | 5/2005 | Thayer | |
| 6,944,063 B2 | 9/2005 | Chen et al. | |
| 6,976,190 B1 | 12/2005 | Goldstone | |

(Continued)

FOREIGN PATENT DOCUMENTS
EP     0 589 597 A3     3/1994

OTHER PUBLICATIONS

SFF Committee Specification, "Self-Monitoring, Analysis and Reporting Technology (SMART) SFF-8035i Revision 2.0", Apr. 1, 1996.*

(Continued)

*Primary Examiner* — Gabriel Chu
(74) *Attorney, Agent, or Firm* — Knobbe Martens Olson & Bear LLP (57) ABSTRACT

A storage subsystem is disclosed that maintains (a) statistics regarding errors detected via an ECC (error correction code) module of the storage subsystem; and/or (b) historical data regarding operating conditions experienced by the storage subsystem, such as temperature, altitude, humidity, shock, and/or input voltage level. The storage subsystem, and/or a host system to which the storage subsystem attaches, may analyze the stored data to assess a risk of a failure event such as an uncorrectable data error. The results of this analysis may be displayed via a user interface of the host system, and/or may be used to automatically take a precautionary action such as transmitting an alert message or changing a mode of operation of the storage subsystem.

23 Claims, 4 Drawing Sheets

```
                                              ┌─ 200
STORAGE SUBSYSTEM OPERATING INFORMATION

DATA RISK LEVEL:              NORMAL      ◄─ 201

Bit Error Statistics
Number of Errors Corrected:   200,000
Number of Sectors Written:    1,000,000
Bit Error Rate:               0.00005
Error Distribution – 0 Errors  900,000   ◄─ 202
Error Distribution – 1 Error   50,000
Error Distribution – 2 Errors  25,000
Error Distribution – >2 Errors 25,000

BIT ERROR RISK LEVEL:         NORMAL     ◄─ 203

Environmental Conditions
Maximum Temperature:          87 C
Minimum Temperature:          5 C
Maximum Relative Humidity:    15%
Maximum Altitude:             3,500 M    ◄─ 204
Minimum Altitude:             200 M
Maximum Shock:                2g

ENVIRONMENTAL RISK:           HIGH       ◄─ 205

Power Conditions
Power ON Time:                560 Hours
Maximum Input Voltage:        5.5 V
Minimum Input Voltage:        4.5 V      ◄─ 206
Time Out of Range:            0 Hours

POWER RISK LEVEL:             LOW        ◄─ 207
```

U.S. PATENT DOCUMENTS

| | | | |
|---|---|---|---|
| 7,079,395 | B2 | 7/2006 | Garnett et al. |
| 7,262,961 | B2 | 8/2007 | Motoe et al. |
| 7,277,978 | B2 | 10/2007 | Khatami et al. |
| 7,447,944 | B2 * | 11/2008 | Hu ................... 714/42 |
| 7,464,306 | B1 * | 12/2008 | Furuhjelm et al. ............ 714/710 |
| 7,694,188 | B2 * | 4/2010 | Raghuraman et al. .......... 714/47 |
| 2002/0138602 | A1 | 9/2002 | Vinberg |
| 2003/0131093 | A1 | 7/2003 | Aschen et al. |
| 2003/0227451 | A1 * | 12/2003 | Chang ........................ 345/211 |
| 2004/0228197 | A1 | 11/2004 | Mokhlesi |
| 2004/0260967 | A1 * | 12/2004 | Guha et al. ........................ 714/3 |
| 2005/0044454 | A1 * | 2/2005 | Moshayedi ..................... 714/54 |
| 2005/0197017 | A1 | 9/2005 | Chou et al. |
| 2005/0268007 | A1 | 12/2005 | Nakabayashi |
| 2005/0281112 | A1 | 12/2005 | Ito et al. |
| 2006/0085670 | A1 | 4/2006 | Carver et al. |
| 2006/0085836 | A1 | 4/2006 | Lyons, Jr. et al. |
| 2006/0095647 | A1 | 5/2006 | Battaglia et al. |
| 2006/0282709 | A1 | 12/2006 | Shu et al. |
| 2007/0008186 | A1 | 1/2007 | Michaels et al. |
| 2007/0053513 | A1 | 3/2007 | Hoffberg |
| 2007/0073944 | A1 | 3/2007 | Gormley |
| 2007/0124130 | A1 * | 5/2007 | Brunet et al. ................... 703/23 |
| 2007/0159710 | A1 * | 7/2007 | Lucas et al. ..................... 360/75 |
| 2007/0180328 | A1 | 8/2007 | Cornwell et al. |
| 2007/0260811 | A1 | 11/2007 | Merry, Jr. et al. |
| 2007/0266200 | A1 * | 11/2007 | Gorobets et al. .............. 711/103 |
| 2007/0268791 | A1 | 11/2007 | Grow et al. |
| 2008/0046766 | A1 * | 2/2008 | Chieu et al. ................... 713/300 |
| 2008/0109591 | A1 * | 5/2008 | Kim et al. ..................... 711/103 |
| 2009/0037643 | A1 | 2/2009 | Ohtsuka et al. |
| 2009/0063895 | A1 * | 3/2009 | Smith ............................... 714/7 |
| 2010/0011260 | A1 * | 1/2010 | Nagadomi et al. ............ 714/704 |

OTHER PUBLICATIONS

International Search Report and Written Opinion in PCT Application No. PCT/US2007/68490; Dated Sep. 29, 2008 in 11 pages.

Office Action dated Jan. 28, 2009 received in related U.S. Appl. No. 11/429,936 in 23 pages.

Webpage printed out from <http://www.m-systems.com/site/en-US/Support/DeveloperZone/Software/LifespanCalc.htm> on Jun. 13, 2006.

Webpage printed out from <http://www.m-systems.com/site/en-US/Technologies/Technology/TrueFFS_Technology.htm> on Jun. 13, 2006.

Webpage printed out from <http://www.techworld.com/storage/features/index.cfm?FeatureID=498> on Jun. 13, 2006.

Document explaining prior sale.

Silicondrive User'S Guide, SiSMART Function, Preliminary Version 2.2 Revision A, Feb. 2005.

International Search Report and Written Opinion for International Application No. PCT/US09/32984, mailed on Mar. 17, 2009, in 10 pages.

International Search Report and Written Opinion for International Application No. PCT/US09/33262, mailed on Mar. 25, 2009, in 11 pages.

Office Action dated Jun 4, 2009 received in related U.S. Appl. No. 11/429,936 in 14 pages.

Notice of Allowance dated Sep. 17, 2009 received in related U.S. Appl. No. 11/429,936 in 25 pages.

Office Action dated Aug 31, 2010 received in related U.S. Appl. No. 12/688,815 in 25 pages.

Office Action dated Jun 1, 2010 received in related U.S. Appl. No. 12/029,370 in 44 pages.

Office Action dated Nov. 18, 2010 received in related U.S. Appl. No. 12/029,370 in 13 pages.

Office Action dated Jan. 11, 2011 received in related U.S. Appl. No. 12/688,815 in 25 pages.

Notice of Allowance dated Mar. 22, 2011 received in related U.S. Appl. No. 12/029,370 in 6 pages.

* cited by examiner

Figure 1

| STORAGE SUBSYSTEM OPERATING INFORMATION | | |
|---|---|---|
| DATA RISK LEVEL: | NORMAL | ← 201 |
| Bit Error Statistics | | |
| Number of Errors Corrected: | 200,000 | |
| Number of Sectors Written: | 1,000,000 | |
| Bit Error Rate: | 0.00005 | ← 202 |
| Error Distribution – 0 Errors | 900,000 | |
| Error Distribution – 1 Error | 50,000 | |
| Error Distribution – 2 Errors | 25,000 | |
| Error Distribution – >2 Errors | 25,000 | |
| BIT ERROR RISK LEVEL: | NORMAL | ← 203 |
| Environmental Conditions | | |
| Maximum Temperature: | 87 C | |
| Minimum Temperature: | 5 C | |
| Maximum Relative Humidity: | 15% | |
| Maximum Altitude: | 3,500 M | ← 204 |
| Minimum Altitude: | 200 M | |
| Maximum Shock: | 2g | |
| ENVIRONMENTAL RISK: | HIGH | ← 205 |
| Power Conditions | | |
| Power ON Time: | 560 Hours | |
| Maximum Input Voltage: | 5.5 V | |
| Minimum Input Voltage: | 4.5 V | ← 206 |
| Time Out of Range: | 0 Hours | |
| POWER RISK LEVEL: | LOW | ← 207 |

SOLID STATE STORAGE SUBSYSTEM THAT MAINTAINS AND PROVIDES ACCESS TO DATA REFLECTIVE OF A FAILURE RISK

BACKGROUND

1. Technical Field

The present disclosure relates to storage subsystems that use solid-state memory devices. More specifically, the present disclosure relates to systems and methods for assessing a risk of a storage subsystem failure.

2. Description of the Related Art

Solid-state storage subsystems are used to store a wide variety of data. With increasing memory capacity, a mixture of information (e.g., program files, set-up files, user data, etc.) corresponding to a variety of storage applications can be conveniently stored on a single solid-state storage subsystem, such as a removable flash memory card or drive that attaches to a host computer. Many of these storage applications demand high levels of data integrity over the life of the subsystem.

SiliconSystems, Inc. the assignee of the present application, sells solid-state storage subsystems that maintain usage statistics regarding the number of program/erase cycles that have been performed in the non-volatile memory array. These usage statistics can be read out using vendor-specific commands, and can be used to estimate the remaining life of the memory array. This technology is commercially known as SiSmart™, and aspects of this technology are disclosed in co-pending U.S. application Ser. No. 11/429,936, filed May 8, 2006, the disclosure of which is hereby incorporated by reference.

SUMMARY

Although usage statistics regarding numbers of program/erase cycles performed are very useful for predicting wear-related failures, they are less useful for predicting failures caused by other conditions. Further, in some situations, such usage statistics are not sufficient to reliably predict the timing of wear-related failures. This may be the case where, for example, a particular memory device has a lower endurance than others, meaning that it will fail after a lesser number of program/erase cycles. Such variations in endurance can be caused by manufacturing irregularities or unusual operating conditions.

The present disclosure addresses these issues by providing a storage subsystem that maintains at least one of the following types of data: (a) statistics regarding errors detected via an ECC (error correction code) module of the storage subsystem; (b) historical data regarding operating conditions experienced by the storage subsystem, such as temperature, altitude, humidity, shock, and/or input voltage level. The storage subsystem, and/or a host system to which the storage subsystem attaches, may analyze the stored data to assess a risk of a failure event, such as an uncorrectable data error. The results of this analysis may be displayed via a user interface of the host system, and/or may be used to automatically take a precautionary action such as transmitting an alert message or changing a mode of operation of the storage subsystem. The storage subsystem may also maintain usage statistics regarding numbers of program/erase cycles performed.

Neither this summary nor the following detailed description purports to define the invention. The invention is defined by the claims.

BRIEF DESCRIPTION OF THE DRAWINGS

Specific embodiments will now be described with reference to the following drawings.

DETAILED DESCRIPTION OF SPECIFIC EMBODIMENTS

The following description is intended to illustrate specific embodiments of the invention, and not to limit the invention. Thus, nothing in this detailed description is intended to imply that any particular feature, characteristic or component is essential to the invention. The invention is defined only by the claims.

I. Overview

Figure 1:
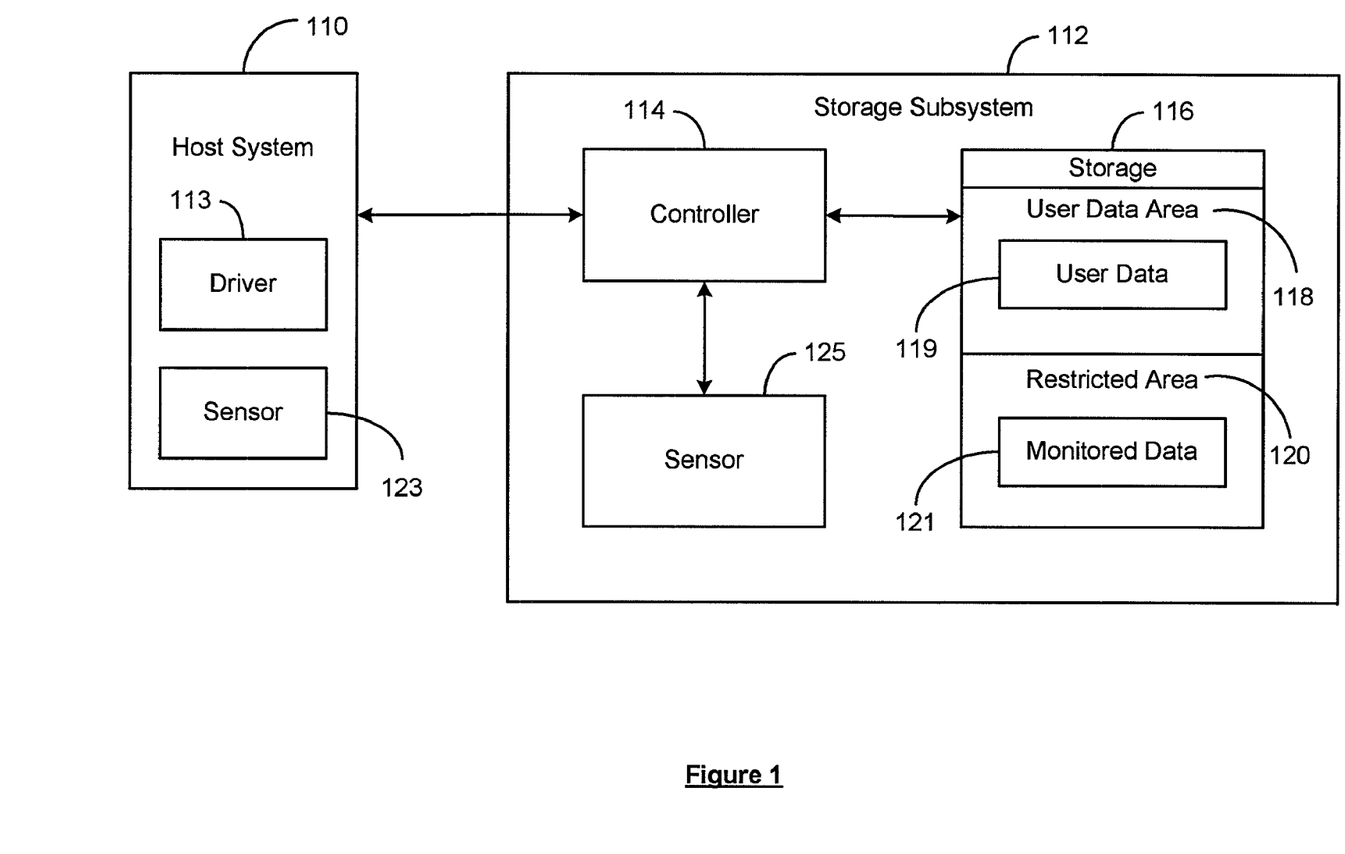
FIG. 1 illustrates a block diagram of a storage subsystem connected to a host system according to one embodiment.

FIG. 1 is a block diagram illustrating a host system 110 connected to a storage subsystem 112 according to one embodiment. The host system 110 may, for example, be a portable computer, a workstation, a router, a handheld instrument system, a computing kiosk, a blade server, a military system, a flight computer, or any other type of computing device. The host system 110 stores data on the storage subsystem 112, and may provide operating system functionality and a boot process for the storage subsystem 112. The host system 110 executes a driver program 113 that provides functionality for communicating with the storage subsystem 112, such as by issuing commands in accordance with an ATA (Advanced Technology Attachment) signal interface or other standard. The driver 113 may communicate with, or be part of, one or more software applications that are configured to use the storage subsystem 112.

The storage subsystem 112 may be in the form of a portable, detachable device, such as a solid-state memory card or drive, that plugs into a slot or external port of the host system 110. The storage subsystem may comply with one or more of the following specifications: CompactFlash, PCMCIA, SmartMedia, MultiMediaCard, SecureDigital, Memory Stick, ATA, ATAPI, PCI Express, PCI Mezzanine Card, AdvancedTCA Mezzanine Card, SATA (Serial Advanced Technology Attachment), or Universal Serial Bus (USB). The storage subsystem pluggably connects to the host system, and receives power from the host system, via a physical/electrical connector 111, such as a USB, CompactFlash, PCMCIA, SATA, or proprietary (non-standard) connector.

The storage subsystem 112 comprises a controller 114 and a solid-state non-volatile memory (NVM) array 116. The NVM array 116 is preferably implemented using flash memory devices, but may be implemented using another type of solid state device, such as volatile memory devices (e.g., DRAM or SRAM) backed up by battery. In some embodiments, the storage subsystem 112 may also include another type of non-volatile storage, such as one or more miniature magnetic disk drives (not shown).

The controller 114 is configured to write data to, and read data from, the NVM array 116 in response to commands from the host 110. The controller 114 includes an error correction code (ECC) module 115 that (1) generates sector-level ECC data when the host 110 writes data to the storage subsystem, and (2) performs ECC checking (including correction of correctable errors) when the host reads data from the storage subsystem. The controller 114 is typically implemented as a single integrated circuit device, but may alternatively comprise multiple distinct devices. In one embodiment, the controller 114 is an ATA flash disk controller that executes a firmware program which embodies the various features described herein. Some or all of the functions of the controller 114 (including ECC generation and checking) may alternatively be automated in application-specific circuitry.

As is conventional, the non-volatile memory array 116 is preferably divided into blocks, and each block is divided into sectors. In the preferred embodiment, the sectors and blocks are configured and used generally as follows: (1) each sector preferably stores 512 bytes of data plus some number of bytes (e.g., 16) of management data; (2) a sector represents the smallest unit of data that can be written to or read from the NVM array; (3) the management data stored in each sector includes ECC (error correction code) data that is generated by the controller 114 on write operations, and used by the controller 114 on read operations to check for and correct errors; (4) a block is the smallest unit of data that can be erased with an erase command; the blocks may, for example, have a size of 128 k+4 k bytes. The errors corrected using the ECC data may be the result of wear, environmental conditions, and other types of conditions. As is conventional, the controller 114 implements a wear-leveling algorithm to reduce the likelihood that certain sectors or blocks will fail long before others.

As illustrated in FIG. 1, the NVM array 116 is preferably subdivided into a user data area 118 and a restricted area 120. The address ranges of these two areas need not be contiguous; for example, portions of the restricted space may be interleaved with portions of the user data space. The user data area 118 is read/write accessible via standard (e.g., ATA) access commands, and is used by the controller 114 to implement a conventional file system (e.g., FAT16 or FAT32). Thus, the user data area 118 is available to host applications and the host operating system to store and retrieve user data 119. The restricted memory area 120 is preferably accessible only via one or more non-standard or "vendor-specific" commands, and thus is not exposed to the host's operating system and applications. Stated differently, the standard memory access command codes used to access the subsystem's user data area 118 do not provide access to the restricted area 120. As described below, the restricted area 120 is used to store configuration and control information, including monitor data 121. In other embodiments of the invention, the restricted area 120 may be omitted; in such embodiments, the data described herein as being stored in the restricted area 120 may be stored in the user data area 118, or on a separate storage device (e.g. a magnetic disk drive).

The restricted area 120 may also be used by the controller 114 to store other types of control information. For example, the restricted area 120 may store firmware executed by the controller 114, security information for controlling access to the user data area 118, and/or wear level data reflective of the wear level of each sector or block of the NVM array 116.

The storage system 112 in the illustrated embodiment further includes one or more sensors 125 that sense, and transmit data/signals indicative of, environmental conditions such as temperature, humidity, altitude, and/or storage subsystem movement. The sensor data detected by the sensor(s) 125 may be read by the controller 114 and stored in the restricted area 120 of the NVM array 116. For example, the controller may periodically read a measurement value from a sensor 125, and maintain a record of the highest and lowest measurement values read since the storage subsystem's initial use. Multiple sensors of different types may be provided, such as a temperature sensor, a humidity sensor, an accelerometer, an altimeter, or any combination thereof. In some embodiments, the storage subsystem does not include a sensor 125.

The sensor data is one type of monitor data 121 that may be stored by the storage subsystem 112 and used to determine a risk of data errors occurring. Other types of monitor data include parameters that may be sensed or generated by the controller 114 or by another circuit of the storage subsystem. For example, the controller 114 may generate and store monitor data 121 that describes the stability of the power signal from the host (e.g., number of anomalies detected per unit time, average anomaly duration, etc.), as detected by a power-anomaly detection circuit.

As another example, the controller 114 may generate and store monitor data 121 descriptive correctable (and possibly uncorrectable) data errors detected on read operations. Examples of specific data-error-rate metrics that may be maintained by the storage subsystem are described below. Other examples of types of monitor data 121 that may be collected include (1) the duration since the last subsystem power-up event, (2) an average subsystem ON time, (3) the total (cumulative) ON time, (4) the number write operations that have failed to complete due to a loss of power and (5) usage statistics regarding numbers of program/erase cycles performed (as described in the above-referenced application). As illustrated in FIG. 1, some or all types of monitor data 121 may be stored in the restricted area 120. Some types of monitor data, such as "duration since the last subsystem power-up event," may alternatively be maintained in volatile storage, or may be read directly from a sensor when needed.

The host system 110 can access the monitor data 121 via one or more vendor-specific (non-standard) commands, or via a special signal interface between the host 110 and the storage subsystem 112. Where multiple types of monitor data 121 are maintained, the storage subsystem may compile this data (or a summarized version thereof) into a fixed-size block that is readable by the host system, and which is arranged according to a format known to the host system's driver 113. As discussed below, the host system's driver 113, or an application that communicates with the driver, may make this data available for viewing on the host system 110 via a special user interface.

The host 110 and/or the controller 114 may also analyze the stored monitor data 121 to assess a risk level associated with the occurrence of data errors. For example, the monitor data 121 may indicate that the storage subsystem 112 is operating in an extreme temperature range (e.g., over 60° C.), or that the bit error rate has exceeded a particular threshold. When such an event occurs, an alert message may be generated and displayed on the host system 110, as described below.

Table 1 illustrates examples of particular variables that may be used by the controller 114 to maintain bit error statistics. Each variable may correspond to a particular sequence of bytes in the restricted memory area, and may be updated by the controller 114 as corresponding events occur. As will be recognized, these variables are merely illustrative, and other variables may be used to accomplish similar functions. The first two variables shown in Table 1 are used to keep track of (1) the total number of times a sector read resulted in a correctable error, and (2) the total number of sector write operations that have been performed. These two variables are global in the sense that they store subsystem-level statistics, rather than sector-level or block-level statistics. These first two variables may be used in combination to compute a ratio of corrected errors to total number of sectors writes. Increases in this ratio over time can indicate an increased likelihood of an uncorrectable error. The variable "Number of Sector Writes" may be incremented by 1 every time a sector write is performed, or may be incremented by N (e.g., 16 or 32) on every Nth sector write.

TABLE 1

| Variable | Variable Size |
| --- | --- |
| Number of Errors Corrected | 4 Bytes |
| Number of Sectors Writes | 8 Bytes |
| Number of Reads with 0 Errors | 8 Bytes |
| Number of Reads with 1 Errors | 4 Bytes |
| Number of Reads with 2 Errors | 4 Bytes |
| Number of Reads with 3 Errors | 4 Bytes |
| Number of Reads with 4 Errors | 4 Bytes |
| Number of Reads with 5 Errors | 4 Bytes |
| Number of Reads with 6 Errors | 4 Bytes |
| Bit error rate (BER) | 4 Bytes |

The next seven variables ("Number of Reads with < > Errors") can be used to maintain additional statistics regarding the detected errors. Each of these variables maintains a storage-subsystem-wide count value. Each time a sector read is performed with no errors or a correctable error, the count value/variable is incremented that corresponds to the number of bits that needed to be corrected. For example, if no bits needed to be corrected, "Number of Reads with 0 Errors" would be incremented; and if two bits needed to be corrected, "Number of Reads with 2 Errors" would be incremented.

The last variable is the bit error rate (BER), and may be calculated as: (Number of bits with errors)/(Number of sector reads×4224 bits/sector). This value indicates the rate of error occurrences in the storage subsystem. Rather than maintaining the BER in non-volatile storage, the controller 114 may generate it on-the-fly when requested by the host 110 or when otherwise needed. Further, the BER could alternatively be generated by the host 110 from the stored variables.

Additional variables may optionally be provided to track errors and usage at the block and/or sector level. In addition, one or more variables may be provided for maintaining "short term" bit error statistics, such as "BER since last power up" or "BER over last minute."

In some embodiments, the monitor data 121 may include event timestamps that indicate when (date and time) the associated measurements were taken or when particular anomalies were detected. Various other types of event metadata may also be stored, such as one or more of the following: (1) an identifier of the host 110 connected to the storage subsystem 112 at the time a particular anomaly was detected, (2) an identifier of the type of operation being performed when a particular anomaly was detected, (3) an indication of how long the storage subsystem had been ON when a particular anomaly was detected, (4) the amount of time since the host 110 last performed a read of the monitor data 121.

The timestamps and other types of event metadata, if provided, may be used by the host system 110 and/or the controller 114 for various purposes, such as to correlate detected error conditions (e.g., a rapid increase in the bit error rate) with particular environmental conditions (e.g., a relatively high operating temperature or humidity level). Where such correlations are detected, the host system 110 and/or the controller 114 may automatically take an appropriate corrective action. For example, if the host 110 or the controller 114 detects that a relatively high bit error rate occurs when the operating temperature exceeds a particular threshold, it may do one or both of the following: (1) adjust the temperature threshold used to generate alert messages, (2) cause the controller 114 to slow its operation (to reduce heat generation) whenever this temperature threshold is reached or exceeded.

In embodiments in which the controller 114 is capable of detecting such correlations, the controller 114 may store descriptions of the detected correlations in the NVM array, and may provide host access to these descriptions.

In some embodiments, the storage subsystem 112 may also be configured to store monitor data 121 generated by one or more sensors of the host system 110. For example, the host system 110 may include one or more sensors 123 that measure(s) temperature, humidity, altitude, or storage subsystem movement. The host system's driver 113 may write the host-generated sensor data to the storage subsystem's restricted area 120 using vendor-specific commands. The host-generated sensor data may supplement subsystem-generated sensor data, and may be used for the same purposes.

In some embodiments, the storage subsystem may include a small display unit, such as a LCD screen or one or more LEDs. This display unit may be used to output a summary indication of the risk level, such as by displaying a single word, color, or icon that represents the risk level. In such embodiments, the ability for the host to access the monitor data may optionally be omitted.

II. Example User Interface

Figure 2:
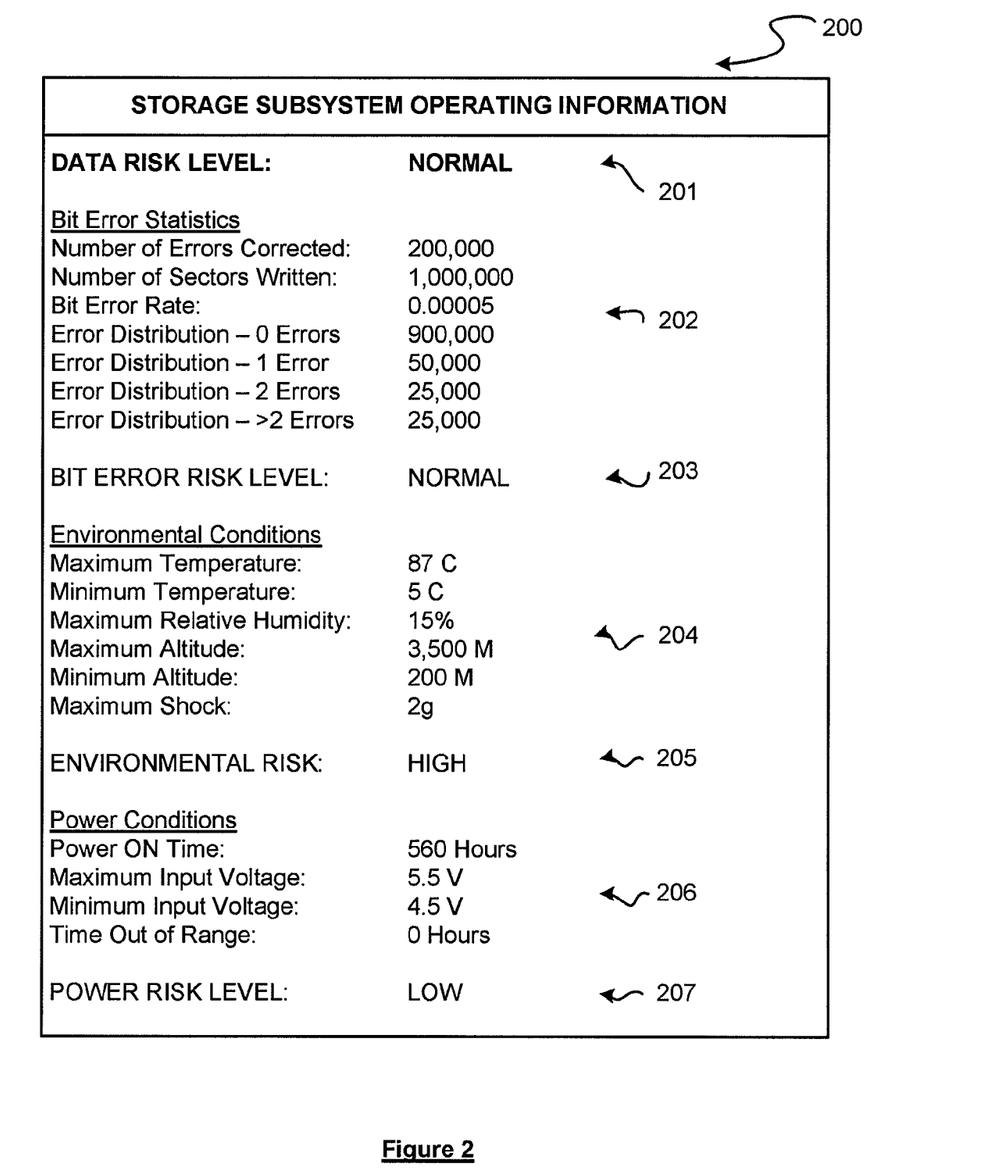
FIG. 2 illustrates a display screen for displaying monitor data and estimated risk levels according to one embodiment.

FIG. 2 illustrates a display screen 200 generated based on monitor data 121 read from the storage subsystem 112 according to one embodiment. The display screen 200 is generated by the driver 113, or application-level software, running on the host system 110. The display screen may, for example, be accessible by clicking on a task bar icon, and may be updated periodically as new monitor data is read from the storage subsystem 112. In some embodiments, the host software that generates the display screen 200 may also generate alert messages that are displayed on the host system 110 and/or communicated by e-mail. The display screen 200 shows bit error statistics 202, environmental conditions 204, and power conditions 206, as monitored by the storage subsystem 112 (and in some cases, the host system 110).

Bit Error Statistics

In the illustrated embodiment of FIG. 2, the bit error statistics include the following: number of errors corrected, number of sector writes performed, bit error rate, and the numbers of reads with zero errors, 1 error, 2 errors, and 2+ errors. These statistics correspond to specific variables shown in Table 1. The number of sector writes may indicate a general wear level of the NVM array 116 and may also be used in conjunction with the number of errors corrected to determine a bit error rate. In the example shown, the bit error rate is approximately 0.00005, which is one bit error for every 20,000 bits written. As mentioned above, the BER may be calculated by the controller 114 (e.g., in response to a vendor-specific command received from the host system) or by the host 110.

In addition to the bit error statistics 202, the display screen 200 includes a summarized bit error risk level 203. The bit error risk level 203 corresponds to an assessment of the likelihood of an uncorrectable data error occurring in the storage subsystem 112, as determined from the bit error statistics. Based on the example in FIG. 2, a BER less than 0.000001 would be "low," and a BER between 0.000001 and 0.0001 would be "normal." A BER between 0.0001 and 0.001 would be "high" and a BER over 0.001 would be "very high." Those skilled in the art will recognize that these numbers are for illustrative purposes only and embodiments may have different risk level definitions in accordance to the needs of the systems. In the example shown, the bit error risk level is "normal." The bit error risk level 203, and the other displayed risk levels 201, 205 and 207 (each discussed below), may be determined by the controller 114 (e.g., via firmware or application specific circuitry) or by the host system 110. In some embodiments, only the risk levels 201, 203, 205 and 207 are displayed, and not the associated numerical data from which these risk levels are derived. The risk levels 201, 203, 205 and 207 may, for example, have possible states of "low," "normal," "high" and "very high," or may be displayed as numerical values, such as percentages.

Environmental Conditions

The environmental conditions 204 shown in FIG. 2 include a maximum temperature, a minimum temperature, a maximum relative humidity, a maximum altitude, a minimum altitude, and a maximum shock level. The controller 114 may maintain these values in the restricted memory area 120 as respective 2-byte data values. The values are preferably based on sensor measurements read by the controller since the inception (initial use or initialization) of the storage subsystem. Additional or alternative environmental parameters, such as a current temperature, may be monitored and displayed. As mentioned above, the environmental conditions are monitored by the storage subsystem 112, and in some cases, the host 110, using one or more sensors 125, 123.

The maximum and minimum temperature fields display the maximum and minimum temperatures detected by the storage subsystem 112 (or the host system 110) during storage subsystem operation. In the example shown, the highest detected temperature is 87° C., and the lowest is 5° C. A very high or very low temperature may correlate with an increase in the likelihood of an uncorrectable data error. The maximum relative humidity field displays the maximum humidity detected by the storage subsystem 112 (or the host system 110) during storage subsystem operation. A high relative humidity may correlate with an increased probability of data errors. In the example shown, the maximum relative humidity is 15%. The maximum and minimum altitude fields display the maximum and minimum altitude as detected by an altimeter 125 of the storage subsystem 112 and/or an altimeter sensor 123 of the host system 110. Extreme altitudes may correspond to conditions, such as temperature or air pressure, that may be related to the risk of data errors in the storage subsystem 112. The maximum shock field may measure whether the storage subsystem has been exposed to extreme shock, which may result in system or device failure, or may correspond to an increased likelihood of data errors. In the example shown, the maximum shock is 2 g.

The environmental risk indicator 205 indicates a risk of an uncorrectable storage subsystem data error, as determined from the monitored environmental conditions. This indicator may, in some embodiments, reflect observed correlations between error occurrences and environmental conditions. For example, if the controller 114 or host 110 has previously detected significant increases in the bit error rate when the temperature is above a threshold level, it may set the environmental risk level 205 to "high" whenever this temperature is reached or exceeded. The environmental risk indicator 205 may alternatively be based on fixed (predefined) thresholds.

Power Conditions

In the embodiment shown in FIG. 2, the power conditions 206 include a power ON time, a maximum input voltage, a minimum input voltage, and a time out-of-range field. According to some embodiments, the power conditions are monitored by the storage subsystem 112 using power detection circuitry. The detection circuitry may be separate from the controller 114 or integrated with the controller 114. The power ON time value represents the amount of time the storage subsystem 112 has been operating since last power-up. A storage subsystem 112 may be more likely to have data errors as the power ON time increases. In the example shown, the power ON time is 560 hours. The power ON time may, for example, be stored in a 4-byte data field in the restricted area 120.

The maximum and minimum voltage fields pertain to the power signal supplied by the host system 110 either generally or since the last power-up, and may be maintained in the restricted area 120 as respective 4-byte values. Abnormal voltage levels can affect reliability and the likelihood of data errors. The time out-of-range field monitors the total amount of time the power signal (input voltage) has fallen outside a prescribed range. In the illustrated example of FIG. 2, the storage subsystem uses a 5 V power signal supplied via a USB interface, and the prescribed range is 4.5-5.5 volts; in this example, the maximum and minimum input voltages do not exceed this range, and the time out-of-range is therefore 0 hours.

The power risk level 207 indicates a risk level for the occurrence of data errors based on the monitored power conditions 206. As with the environmental risk level 205, this risk level 207 may optionally be based on observed correlations. For example, the host 110 or the controller 114 may detect that data errors occur significantly more frequently when the input voltage falls below a particular level, and may therefore set the power risk level to "high" whenever the voltage drops below this level. Fixed thresholds may additionally or alternatively be used.

Overall Risk Level

The "data risk level" indicator 201 shown at the top of FIG. 2 represents an overall risk level. This indicator may, for example, be generated based on a combination of the bit error statistics, environmental conditions, power conditions, and usage statistics (e.g., average number of program/erase cycles per block). In some embodiments, the host software may only display this overall risk level 201, without the other elements shown in FIG. 2.

As will be recognized, the particular parameters shown in FIG. 2 are merely illustrative of the types of conditions that may be monitored. In some embodiments, only a particular type of condition may be monitored (e.g., bit error statistics only, or environmental conditions only). Further, additional parameters not included in FIG. 2 may be monitored and displayed.

In some embodiments, when the bit error risk level 203, the environmental risk level 205, the power risk level 207, and/or the data risk level 201 is/are greater than some predetermined level, data stored in the NVM array while the storage subsystem 112 is in this condition is tagged to indicate it was written during an extreme condition. For example, for each sector write operation, one or more bytes of management data may be stored that indicate the conditions that existed at the time of the sector write. This information may later be used to detect correlations between data errors and particular conditions. Further, the storage subsystem may automatically modify its operation during these extreme conditions, such as by reducing its clock speed to reduce power consumption and heat generation.

III. Example Monitoring Process

Figure 3:
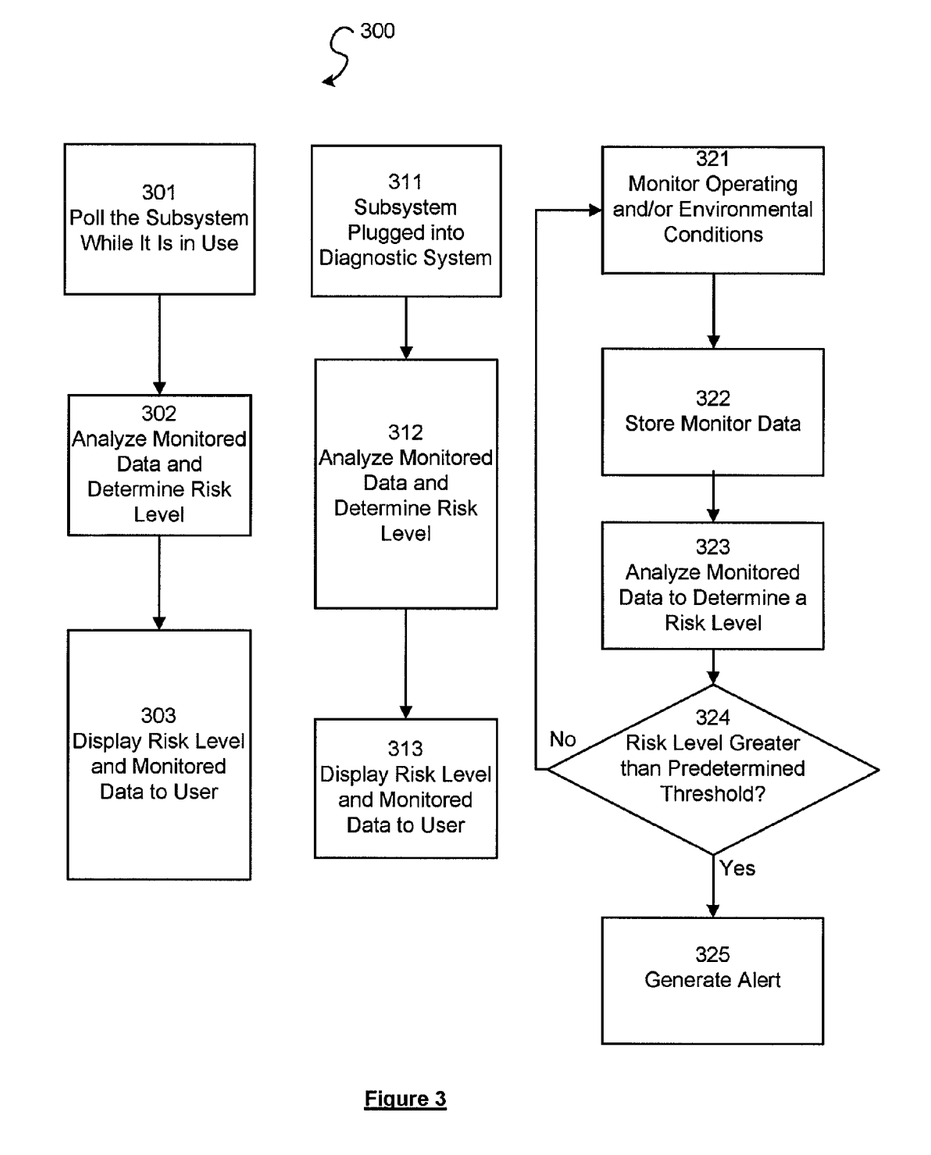
FIG. 3 illustrates a flow chart showing a process for monitoring operating and environmental conditions of a storage subsystem, determining a risk level, and displaying the data according to one embodiment.

FIG. 3 illustrates one example of a process 300 that may be used to collect and analyze the monitor data. The process 300 may be implemented as firmware or application specific circuitry of the storage subsystem 112, and/or by the host system 110. The steps shown may be performed in a different order according to some embodiments, and certain steps may be omitted. In this particular example, the process implements multiple display modes, with the current display mode governing the type of information output to the user; in other embodiments, only a single display mode may be used. In one embodiment, the user can use the monitor data in three modes: a monitor mode, a diagnostic mode, and an alert mode.

In the monitor mode, at state 301, the user can poll the storage subsystem 112 while it is connected to the host system 110 and/or in operation. The storage subsystem 112 then analyzes the monitored data and determines the risk level at state 302. The risk level and monitored data are then displayed to the user at state 303. For example, the display may comprise monitor data and risk levels such as those shown and described with respect to FIG. 2. The data may be displayed on a display device of the host system 110. The displayed data may be updated substantially in real-time, when data is written to or read from the storage subsystem 112, periodically, or according to a user command. In some embodiments, the storage subsystem 112 has a built-in display device, such as an LCD screen or multiple colored LEDs. If multiple colored LEDs are utilized, a first color (e.g., green) may indicate a "low" risk level, a second color (e.g., orange) may indicate a "normal" risk level, and a third color (e.g., red) may indicate a "high" risk level.

In the diagnostic mode, at state 311 the storage subsystem 112 is plugged into a diagnostic system. Then at state 312 the diagnostic system analyzes the monitored data and determines the risk level at state 312. The risk level and monitored data are then displayed to the user at state 313. In one embodiment, monitor data is displayed on a display device of the host system 110. The displayed monitor data may comprise timestamps or other indicators to synchronize the occurrence of certain operating or environmental events with the writing of data to specific sectors. For example, a group of sectors may be identified as having been written when the environmental temperature was greater than 85° C., and these sectors may be analyzed to determine what effect the conditions have on the likelihood of data errors. A diagnostic analysis at state 313 may also allow for the qualification of the storage subsystem 112 or for failure analysis. For example, the historical monitor data may be used to determine whether the storage subsystem 112 was abused or used out of specification for warranty purposes.

In the alert mode, monitoring is done in the background and alerts are generated as needed. At states 321 and 322, the applicable operating and/or environmental conditions are monitored, and the resulting monitor data 121 is stored in the restricted area 120. Although shown as particular steps in a sequence, the task of generating and storing monitor data preferably occurs substantially continuously. Next, at state 323 of the process 300, the stored monitor data 322 is analyzed to determine one or more risk levels, such as those described above. Then at decision state 324, the process determines whether the risk level determined at state 323 is greater than a predetermined or correlation-based threshold. Where multiple types of risk levels are determined at state 323, the process may determine whether any of these risk levels is greater than its corresponding threshold. In other embodiments, a combination or function of the several risk levels may be generated and compared to a single threshold.

When the risk level is greater than the threshold at decision state 324, an alert is generated at state 325. The alert may, for example, include any one or more of the following: (1) activation of an LED of the storage subsystem, (2) generation of an e-mail notification, (3) generation of a pop-up window with an alert message on the host's display screen, (4) modification of the appearance of a taskbar icon on the host system 110, (5) generation of an audible alert signal.

The process 300 returns to state 321 and continues monitoring data after an alert is generated at state 325. The process 300 also returns to state 321 if at decision state 324 it is determined that the risk level is not greater than the threshold. The monitoring continues in the background until risk level requirements for an alert are met and then an alert will be generated. Alerts may also be generated based on wear level statistics, such as block-specific counters of the type described in the above-referenced patent application.

IV. Storage Subsystem Construction

Figure 4:
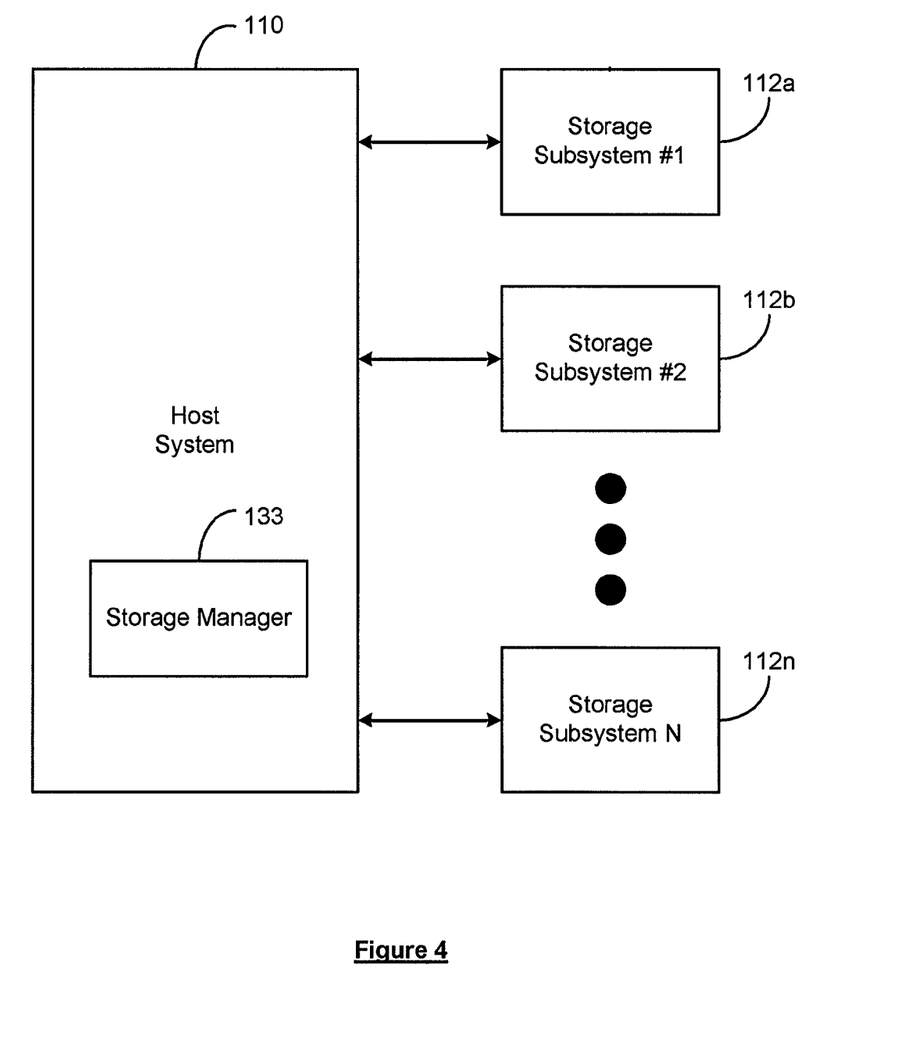
FIG. 4 illustrates a block diagram showing a plurality of storage subsystems connected to a host system.

Some additional details of specific embodiments of the storage subsystem 112 will now be described with reference to FIG. 1. As mentioned above, the storage subsystem 112 may be a solid-state memory card or drive that plugs into a slot or port of the host system 110, and may comply with one of the following card specifications: CompactFlash, PCMCIA, SmartMedia, MultiMediaCard, SecureDigital, Memory Stick, ATA, ATAPI, SATA, PCI Express, PCI Mezzanine Card, and AdvancedTCA Mezzanine Card. The storage subsystem 112 may also have a housing and signal interface that complies with one of the following specifications: sub 1 inch hard disk drive, 1.8 inch hard disk drive, 2.5 inch hard disk drive and 3.5 inch hard disk drive. A custom form factor and/or signal interface may alternatively be used. Although the storage subsystem 112 typically includes a physical connector for attaching to the host 110, the storage subsystem 112 may alternatively communicate with the host via a wireless interface such as Bluetooth or IEEE-802.11. As shown in FIG. 4, in an alternate embodiment a plurality of storage subsystems 112a to 112n can be connected to and controlled by the host 110. The host may additionally include a storage manager 133 to manage the plurality of storage subsystems.

In one embodiment, the controller 114 comprises an ATA flash disk controller that executes firmware. The firmware executed by the controller 114 embodies functionality for implementing the features described herein, including providing access to the restricted memory area 120 via vendor-specific commands. The controller 114 may alternatively be implemented in-whole or in-part as an ASIC, FPGA, or other device, which may but need not execute firmware.

The NVM array 116 may, but need not, be implemented using NAND memory components. The NVM array 116 may comprise a plurality of solid-state storage devices coupled to the controller 114. The NVM array 116 may comprise, for example, flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory, NOR memory, EEPROM, Ferroelectric Memory (FeRAM), or other discrete NVM chips. The solid-state storage devices may be physically divided into blocks, pages and sectors, as is known in the art. As mentioned above, other forms of storage (e.g., battery backed-up volatile DRAM or SRAM devices, magnetic disk drives, etc.) may additionally or alternatively be used.

All possible combinations of the various features and characteristics described herein are contemplated, and are intended to fall within the scope of this disclosure.

The foregoing embodiments have been presented by way of example only, and are not intended to be limiting. Indeed, the novel features described herein may be embodied in a variety of other forms, including forms that do not provide all of the benefits described herein. Furthermore, various omissions, substitutions and changes in the form of the disclosed features may be made without departing from the invention, which is defined by the accompanying claims.

What is claimed is:

1. A storage subsystem, comprising:
    a solid-state, non-volatile memory array;
    a connector for attaching the storage subsystem to a host system;
    at least one sensor that collects data related to at least one type of environmental condition including one or more of conditions related to temperature, humidity, altitude, shock, and power; and
    a controller configured to write data to and read data from the non-volatile memory array in response to commands received from the host system, said controller configured to generate and store data on write operations, and to use error correction code (ECC) data to check for and correct errors on read operations;
    wherein the storage subsystem is configured to:
        maintain statistical data, based at least in part on the ECC data, that is reflective of a rate at which errors are detected on said read operations, and event timestamp data that is correlated to the statistical data;
        when the rate at which said errors are detected exceeds a threshold during a time period in which a write operation is performed, store condition data reflective of a condition of the storage subsystem with data written by the write operation; and
        provide said statistical data, said data collected by the at least one sensor, said condition data, and said event timestamp data to the host system via said connector, the storage subsystem thereby enabling the host system to monitor a health of the storage subsystem and to use the event timestamp data and the condition data to correlate an increased rate of errors with an environmental condition observed by the at least one sensor.

2. The storage subsystem of claim 1, wherein the statistical data comprises a first value that indicates a number of write operations performed, and a second value that indicates a total number of errors corrected.

3. The storage subsystem of claim 2, wherein the statistical data further comprises a plurality of counter values, each of which corresponds to a different respective number of bits errors on a read operation.

4. The storage subsystem of claim 1, wherein the statistical data comprises a value that represents a bit error rate of the storage subsystem.

5. The storage subsystem of claim 1, wherein the controller is configured to analyze the statistical data to assess a risk of a failure event.

6. The storage subsystem of claim 5, wherein the controller is configured to modify a mode of operation of the storage subsystem when said risk of a failure event reaches a threshold level, to thereby reduce a likelihood of a failure event occurring.

7. The storage subsystem of claim 1, wherein the controller implements an Advanced Technology Attachment (ATA) command set, and implements at least one vendor-specific command that enables the host system to retrieve the statistical data.

8. The storage subsystem of claim 1, in combination with executable code configured to run on the host system, said executable code configured to display at least some of said statistical data, and/or a risk indicator derived therefrom, on a display of the host system.

9. The storage subsystem of claim 1, wherein the controller maintains said statistical data in a restricted area of the non-volatile memory array.

10. The storage subsystem of claim 1, wherein the controller is further configured to detect, and store data regarding, correlations between environmental conditions sensed by said sensor and errors detected via said ECC checking.

11. The storage subsystem of claim 1, wherein the controller is further configured to maintain, and output to the host system, data regarding an amount of time the storage subsystem has been powered up.

12. The storage subsystem of claim 1, wherein the controller is further configured to maintain, and output to the host system, data regarding a stability of a power signal received from the host system.

13. The storage subsystem of claim 1, wherein the controller is further configured to maintain historical measurement data reflective of said measurements in the non-volatile memory array, and output said historical measurement data to the host system.

14. The storage subsystem of claim 1, wherein the at least one sensor comprises a temperature sensor.

15. The storage subsystem of claim 1, wherein the at least one sensor comprises an altitude sensor.

16. The storage subsystem of claim 1, wherein the at least one sensor comprises a shock sensor.

17. The storage subsystem of claim 1, wherein the at least one sensor comprises a humidity sensor.

18. The storage subsystem of claim 1, in combination with the host system, wherein the host system is programmed to use the statistical and timestamp data received from the storage subsystem to determine whether a correlation exists between an increased error rate and a sensed environmental condition.

19. The storage subsystem of claim 18, wherein the environmental condition is a temperature of the storage subsystem and the host system is further configured to adjust a mode of operation of the storage subsystem to effect a change in the temperature.

20. A method for monitoring data error in a storage subsystem, the method comprising:
    generating and storing error correction code (ECC) data descriptive of write data received by the storage subsystem from a host system, and storing said write data and ECC data in a non-volatile solid state memory array of the storage subsystem;
    performing ECC checking of said write data and ECC data when the write data is subsequently read from the non-volatile solid state memory array, said ECC checking performed by an ECC module of the storage subsystem;
    collecting, via a sensor, data related to at least one type of environmental condition including one or more of conditions related to temperature, humidity, altitude, shock, and power;
    maintaining statistical data in said storage subsystem reflective of a rate at which errors are detected by the ECC module and event timestamp data that is correlated to the statistical data; and
    when the rate detected by the ECC module exceeds a threshold during a time period in which a write operation is performed, writing condition data reflective of a condition of the storage subsystem to the non-volatile solid state memory array with data written by the write operation; and using said statistical data, said data collected by the sensor, said condition data, and said event timestamp data to monitor a health of the storage subsystem and determine a correlation between an increased rate of errors and an environmental condition observed by the sensor.

21. The method of claim 20, further comprising programmatically analyzing the statistical data to assess a risk of a storage subsystem failure.

22. The method of claim 20, wherein the environmental condition is a temperature of the storage subsystem and the method further comprises: adjusting a mode of operation of the storage subsystem to effect a change in the temperature.

23. A storage subsystem, comprising:
- a solid-state, non-volatile memory array;
- a connector for attaching the storage subsystem to a host system;
- at least one sensor that collects data related to at least one type of environmental condition including one or more of conditions related to temperature, humidity, altitude, shock, and power; and
- a controller configured to write data to and read data from the non-volatile memory array in response to commands received from the host system, said controller configured to generate and store data on write operations, and to use error correction code (ECC) data to check for and correct errors on read operations;

wherein the storage subsystem is configured to:
- maintain statistical data, based at least in part on the ECC data, that is reflective of a rate at which errors are detected on said read operations;
- in response to the rate at which said errors are detected exceeding a threshold during a time period in which a write operation is performed, store condition data reflective of a condition of the storage subsystem with data written by the write operation; and
- provide said statistical data, said data collected by the at least one sensor and said condition data to the host system via said connector, the storage subsystem thereby enabling the host system to monitor a health of the storage subsystem and to use the condition data to correlate an increased rate of errors with an environmental condition observed by the at least one sensor.

* * * * *